June 8, 1965 P. HAMMELMANN 3,187,674
DEVICE FOR REGULATING CONTACT PRESSURE BETWEEN DRIVING
AND DRIVEN ELEMEMTS OF TRANSMISSION
Filed Jan. 9, 1963 2 Sheets-Sheet 1
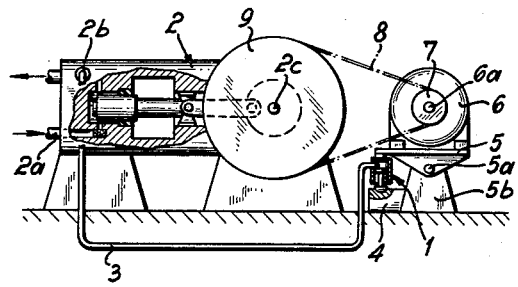
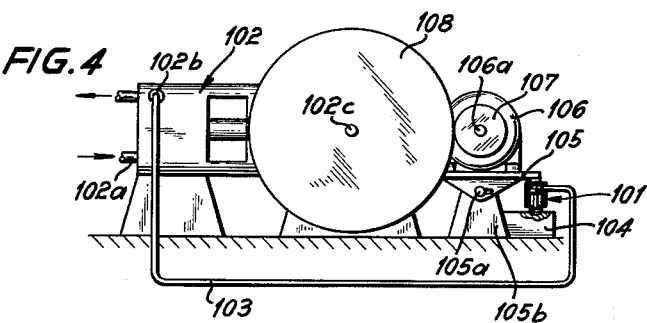
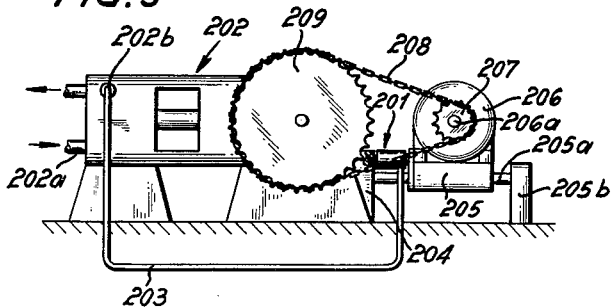
INVENTOR:
Paul HAMMELMANN
By Michael S. Striker,
his ATTORNEY

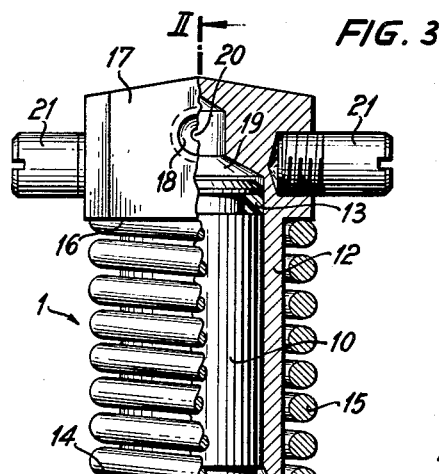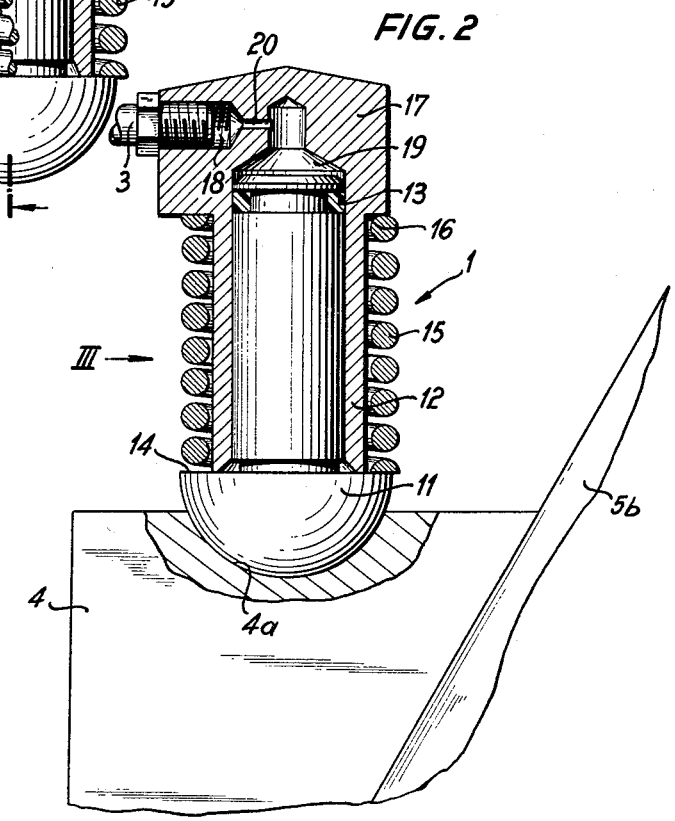

United States Patent Office 3,187,674
Patented June 8, 1965

3,187,674
DEVICE FOR REGULATING CONTACT PRESSURE BETWEEN DRIVING AND DRIVEN ELEMENTS OF TRANSMISSION
Paul Hammelmann, 17 Zum Sundern, Oelde, Westphalia, Germany
Filed Jan. 9, 1963, Ser. No. 250,253
Claims priority, application Germany, Jan. 16, 1962, H 44,638
19 Claims. (Cl. 103—57)

The present invention relates to transmissions in general, and more particularly to a device which is utilized for regulating the pressure between a driving element and one or more driven elements of a transmission. Still more particularly, the invention relates to a device which is especially suited for regulating contact pressure between driving and driven elements of transmissions of the type wherein driven elements offer variable resistance to transfer of motion thereto.

It is well known that certain types of transmissions (particularly belt transmissions, chain transmissions and friction gearings) must be equipped with means for generating at least some contact pressure between driving and driven elements. In belt transmissions, the belt is often tensioned by a weighted pulley which insures that the belt may transmit motion to the driven pulley or pulleys even if its length changes owing to climatic conditions or owing to certain characteristics of the material of which the belt consists, i.e., such tensioning devices insure that the belt remains permanently under a predetermined tension. A serious drawback of such tensioning devices is that they must be calculated with a view to insure that the belt may transmit motion regardless of variations in resistance which the driven element or elements offer to transfer of motion thereto. Thus, when the transmission drives a machine which offers very little resistance to transfer of motion, the tensioning action is just as pronounced as in the event when the machine consumes more power and thus offers greater resistance to transfer of motion. Consequently, the wear upon the belt and on the pulleys or sheaves is excessive.

The situation is similar in friction gearings wherein a pair of friction wheels is held in motion transmitting engagement with a predetermined pressure which is sufficient to prevent excessive slippage or to eliminate slippage between the contacting surfaces of the wheels regardless of the magnitude of loads upon the driven wheel, i.e., regardless of the resistance which the driven wheel offers to transfer of motion by the driving wheel. In chain transmissions which differentiate from belt transmissions and friction gearings in that they constitute a means for positive transmission of power (without relying solely on friction), some tensioning of the chain is often necessary to avoid undue slackening in response to progressive wear on the chain links and on the sprockets.

Accordingly, it is an important object of the present invention to provide a transmission wherein the wear upon the cooperating driving and driven elements is much less than in aforementioned conventional transmissions.

Another object of the invention is to provide a transmission which is combined with a novel regulating device for changing contact pressure between the driving and driven elements of the transmission in such a way that the pressure is just sufficient to insure that the driving element will transmit motion with unchanging efficiency irrespective of the resistance which the driven element or elements offer to transfer of motion thereto.

A further object of the invention is to provide a transmission which is especially suited for transmitting motion from a prime mover to a hydrodynamic machine, such as a pump or a compressor of the type wherein the resistance which the machine offers to motion increases proportionally with fluid pressure which is being built up in the machine.

An additional object of the invention is to provide a novel regulating device which is equally useful for adjusting contact pressure between driving and driven elements of a positive or non-positive power transmission.

A concomitant object of the present invention is to provide a regulating device of the just outlined characteristics which is constructed and assembled with a view to be readily detachable from a transmission so that it may be reused in connection with another type of transmission, which is of very compact design, which need not be provided with a separate source of power, which automatically reduces contact pressure when the transmission is idle, and which may be modified or completed to produce some contact pressure even if the transmission is idle.

A further object of the invention is to provide a regulating device of the above outlined characteristics which is capable of regulating contact pressure by hydraulic or pneumatic action.

With the above objects in view, the invention resides in the provision of a motion transmitting arrangement which includes a transmission comprising a driven element arranged to offer variable resistance to transfer of motion thereto (preferably by driving a hydraulic pump, an air compressor or another pressure generating machine) and a driving element which is in motion transmitting engagement with the driven element, and regulating means operatively connected with one of the elements for moving such one element with respect to the other element in a direction to increase contact pressure between the elements in response to increasing resistance which the driven element offers to transfer of motion thereto by the driving element. In one of its preferred forms, the regulating means comprises a hydraulic or pneumatic cylinder and piston assembly whose cylinder chamber is connected to the pressure side of the pressure generating machine so that changes in pressure of fluid discharged by the machine will determine the magnitude of contact pressure between the driving and driven elements of the transmission.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is a schematic side elevational view of an apparatus which comprises a belt transmission and the pressure between the belt and the pulleys of the transmission is controlled by a regulating device which embodies my invention;

FIG. 2 is an enlarged axial section through the regulating device as seen in the direction of arrows from the line II—II of FIG. 3;

FIG. 3 is a partly elevational and partly vertical sectional view of the regulating device as seen in the direction of the arrow III in FIG. 2;

FIG. 4 is a schematic side elevational view of a modified apparatus wherein the regulating device controls the pressure between the wheels or disks of another transmission which assumes the form of a friction gearing; and FIG. 5 is a schematic side elevational view of a further apparatus wherein the regulating device of my invention controls the tension of an endless chain and hence the pressure between this chain and a pair of sprockets forming part of a chain transmission.

Referring now in greater detail to the drawings, and first to FIG. 1, there is shown an apparatus including a hydrodynamic machine 2, here shown as a high-pressure hydraulic pump, having a housing wherein one or more pistons are reciprocated by a crankshaft 2c which is driven by a pulley 9. The pump 2 draws fluid through a suction line or intake 2a and discharges pressure fluid through a pressure line or outlet 2b. The exact construction of the pump 2 forms no part of my invention, and it is possible to replace this pump by another type of pump, by a compressor which produces one or more streams of pressure fluid in response to rotation of the driven pulley 9, or by another pressure generating machine. The pulley 9 is driven by an endless V belt, band or cable 8, hereinafter also called driven element, which is trained around a driver pulley 7, hereinafter also called driving element, and this pulley 7 is mounted on the output shaft 6a of an electric motor 6 or a similar prime mover. The motor 6 is mounted on a movable support 5 which assumes the form of a rocker and which is tiltable around a horizontal pivot pin 5a secured to a fixed pedestal 5b. This pedestal is rigid with a fixed block 4, hereinafter called fixed support, which supports one main component of a device 1 serving as a means for regulating the contact pressure between the driving element 7 and the driven element 8 in dependency on variations in the pressure of fluid which is being discharged through the outlet 2b at the pressure side of the pump 2, i.e., in response to variations in the load upon the driven element 8.

The exact construction of the regulating device 1 is shown in greater detail in FIGS. 2 and 3. This device assumes the form of a single-acting cylinder and piston assembly including a first main component or cylinder 12 which is preferably detachably fixed to the movable support 5, and a second main component or piston 10 which is reciprocable in the cylinder 12 and whose lower end portion, as viewed in FIGS. 1 to 3, may consist of a spherical body 11, hereinafter called ball, which is turnable in a concave socket 4a provided in the upper side of the fixed support 4. In other words, the piston 10 need not be positively connected with the support 4 and, if desired, the upper end portion or head 17 of the cylinder 12 may be mounted in similar fashion in the underside of the movable support 5. In the embodiment of FIGS. 1 to 3, the head 17 extends into a suitably configurated recess provided at the underside of the movable support 5 and is retained therein by two radially extending coaxial screw bolts 21 which serve as a means for detachably securing the regulating device 1 to the movable support 5 and for permitting angular displacements of the regulating device about the common axis of the bolts 21. That end portion of the piston 10 which is nearer to the upper end of the cylinder chamber 19 carries a sealing ring 13 which prevents bleeding of pressure fluid around the piston and through the open lower end of the cylinder. As shown in FIGS. 2 and 3, the cylinder head 17 is formed with a tapped bore 18 which communicates with a throttling passage 20 leading into the cylinder chamber 19. A supply conduit 3 (see FIG. 1) connects the pressure side (the outlet 2b) of the pump 2 with the bore 18 so that the pressure of fluid in the cylinder chamber 19 is proportional with or equals the pressure prevailing at the pressure side of the pump.

In order to insure that the driven element 8 is maintained under some initial tension, a resilient pressing member here shown as a preferably helical spring 15 operates between an external shoulder 16 of the cylinder head 17 and between the upper side 14 of the ball 11 to serve as a means for permanently biasing the cylinder 12 in upward direction whereby the movable support 5 tends to pivot in a clockwise direction, as viewed in FIG. 1, so that the driven element 8 is subjected to initial tension even if the pressure of fluid in the chamber 19 drops to zero or below such value which is equivalent to the bias of the spring 15. An important advantage of such mounting of the spring 15 is that the spring is automatically relieved when the pump 2 is in operation because, as soon as the pressure of fluid in the chamber 19 reaches a magnitude which is equal to or which exceeds the bias of the spring, the latter is permitted to expand to an extent which is proportional with the angular displacement of the movable support 5 about the axis of the pin 5a.

The throttling passage 20 reduces the sensitivity of the regulating device 1 to insure that the regulating device will not respond to comparatively small fluctuations in the pressure of fluid contained in the supply conduit 3, i.e., that the wear on movable parts of the apparatus is held to a permissible minimum.

The apparatus of FIGS. 1 to 3 operates as follows:

If the motor 6 is idle, the pressure of fluid in the supply conduit 3 and hence in the cylinder chamber 19 is zero so that the spring 15 must maintain the driving element 7 in frictional engagement with the driven element 8 to insure that the element 8 is not too loose and cannot fall off the pulleys. However, when the motor 6 is started and drives the element 7, the belt transmission including the parts 7, 8, 9 becomes operative and causes the pump 2 to draw fluid through the intake 2a and to discharge pressure fluid through the outlet 2b whereby the conduit 3 transmits pressure to the fluid contained in the chamber 19. The cylinder 12 tends to move upwardly and away from the fixed support 4 so that the movable support 5 exhibits a tendency to rock in a sense to increase the contact pressure between the elements 7, 8 proportionally with increasing pressure of the fluid which is being discharged through the outlet 2b. Thus, once the pump 2 begins to operate, the function of the spring 15 is taken over by fluid which is entrapped in the chamber 19 and the pressure of this fluid insures that the contact pressure between the elements 7, 8 is always proportional with the pressure of fluid in the outlet 2b. Consequently, such contact pressure is always sufficient to prevent or to reduce slippage even if the resistance which the part or parts driven by the pulley 9 offer to rotation of this pulley increases when the pump 2 is in actual operation.

As soon as the motor 6 is arrested, the pressure of fluid in the chamber 19 drops to zero and the spring 15 takes over to maintain the driven element 8 under predetermined initial tension, i.e., to insure that some contact pressure between the elements 7, 8 exists even if the apparatus is idle. It will be noted that the regulating device adjusts contact pressure in response to variations in the load upon the driven part or parts of the belt transmission.

If desired, the regulating device 1 may be arranged to move the pump 2 and the pulley 9 toward and away from the pulley 7. In such instances, the motor 6 may be fixed to the pedestal 5b but the pump 2 must be rockable or reciprocable with respect to the motor.

FIG. 4 illustrates a modified apparatus wherein an electric motor 106 drives a hydrodynamic pressure generating machine 102 through a different transmission which assumes the form of a friction gearing including a driving element or friction wheel 107 on the output shaft 106a of the motor 106, and a driven element or friction wheel 108 on the pump shaft 102c. The motor 106 is mounted on a movable support in the form of a rocker 105 which is pivotable about a horizontal pin 105a carried by a fixed pedestal 105b. The regulating device 101 operates between a fixed support 104 and the rocker 105, and the construction of this regulating device may be exactly the same as that of the device shown in FIGS. 2 and 3. Thus, when the motor 106 is started and the pressure generating machine 102 draws fluid through the intake 102a, some pressure fluid is branched off from the pressure side (outlet 102b) into the supply condut 103 to tilt the movable support in an anti-clockwise direction, as viewed in FIG. 4, and to thereby increase the contact pressure between the elements 107, 108. This regulating device 101 also comprises a spring (not shown) which maintains the elements 107, 108 in contact when the machine 102 is idle.

It will be readily understood that the apparatus of FIG. 1 or 4 may comprise two or more regulating devices which may be connected in parallel or each of which may be connected with a separate supply conduit. Furthermore, it is obvious that the spring 15 need not be mounted between the piston and the cylinder of the regulating device since one or more such springs or other types of biasing means may be installed directly between the supports 4, 5 of FIG. 1 or between the supports 104, 105 of FIG. 4. All such modifications are so obvious that they will be readily comprehended without additional illustrations.

Referring finally to FIG. 5, there is shown an apparatus which comprises a pressure generating machine in the form of a pump 202 having an intake 202a and an outlet 202b which is connected with a supply conduit 203 leading to a regulating device 201 which is identical with the regulating device of FIGS. 2 and 3 which operates between a fixed support 204 and a movable support 205, the latter assuming the form of a horizontally reciprocable carriage and being shiftable along guideways 205a extending between the fixed support 204 and a second fixed support or platen 205b. The carriage 205 supports an electric motor 206 whose output shaft 206a is rigid with a driving element here shown as a sprocket wheel 207 serving as a means for driving an endless chain 208 which corresponds to the driven element 8 or 108 and is trained around a driven sprocket wheel 209 which operates the machine 202. Thus, the regulating device 201 controls a chain transmission including the parts 207, 208, 209 and tends to shift the carriage 205 with the driving element 207 in such direction as to increase the contact pressure between the driving element and the driven element 208 proportionally with increasing pressure of fluid at the pressure side of the machine 202.

It goes without saying that the chain transmission 207–209 may be replaced by a belt transmission or by a friction gearing so that, and referring to FIG. 1, the movable support 5 could assume the form of a carriage which is reciprocable toward and away from the driven pulley 9, and the regulating device would normally tend to move the support 5 away from the pulley 9 in order to increase the contact pressure between the elements 7, 8. In other words, the movable support may be mounted for translatory (linear) or angular displacements and may assume an infinite number of postions each of which corresponds to a different contact pressure between the driven element and the driving element.

In this description and in the claims, the definition "hydrodynamic machine" is intended to embrace hydraulic and pneumatic pressure generators, such as hydraulic pumps, pneumatic pumps, air compressors, and others.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptions should and are intended to be comprehended within the meaning and range of equivalence of the following claims.

What is claimed as new and desired to be secured by Letters Patent is:

1. A motion transmitting arrangement which comprises a transmission including a driven element arranged to offer variable resistance to transfer of motion thereto, and a driving element in motion transmitting engagement with said driven element, one of said elements being movable with respect to the other element in directions to change the contact pressure between said elements; regulating means operatively connected with said one element for moving said one element in a direction to increase such contact pressure only in response to increasing resistance which said driven element offers to transfer of motion by said driving element; and pressing means operatively connected with said one element for providing contact pressure between said elements at least when no resistance is offered by the driven element, said pressing means providing a decreasing bias on said one element as said regulating means moves said one element to increase the contact pressure.

2. A motion transmitting arrangement which comprises a transmission including a driving pulley, a driven pulley arranged to offer variable resistance to transfer of motion thereto, and an endless flexible element trained around said pulleys for transmitting motion of said driving pulley to said driven pulley, one of said pulleys being movable with respect to the other pulley in directions to change the tension of said flexible element and to thereby adjust the contact pressure between said flexible element and said pulleys; regulating means operatively connected with said one pulley for moving said one pulley in a direction to increase such contact pressure in response to increasing resistance which said driven pulley offers to transfer of motion by said flexible element; and resilient pressing means operatively connected to said one pulley for biasing said one pulley in said direction to increase the contact pressure between said flexible element and said pulleys, said resilient means providing a decreasing bias on said one pulley as said regulating means moves said one pulley to increase the contact pressure so that said contact pressure has a minimum value when said driven pulley offers no resistance.

3. A motion transmitting arrangement which comprises a transmission including a driven friction wheel arranged to offer variable resistance to transfer of motion thereto and a driving friction wheel which is in motion transmitting engagement with said driven wheel, one of said wheels being movable with respect to the other wheel in directions to change the contact pressure between said wheels; regulating means operatively connected with said one wheel for moving said one wheel in a direction to increase the contact pressure between said wheels in response to increasing resistance which said driven wheel offers to transfer of motion by said driving wheel; and resilient pressing means operatively connected with said one wheel for biasing said wheel in said direction to increase the contact pressure between said wheels, said resilient pressing means providing a decreasing bias on said one wheel as said regulating means moves said one wheel to increase the contact pressure, so that said contact pressure has a minimum value when said driven wheel offers no resistance.

4. A motion transmitting arrangement which comprises a transmission including a driving sprocket, a driven sprocket arranged to offer variable resistance to transfer of motion thereto, and an endless chain trained around said sprockets for transmitting motion from said driving sprocket to said driven sprocket, one of said sprockets being movable with respect to the other sprocket in directions to change the tension of said chain and to thereby adjust the contact pressure between said chain and said sprockets; regulating means operatively connected with said one sprocket for shifting said one sprocket in a direction to increase such contact pressure in response to increasing resistance which said driven sprocket offers to transfer of motion by said chain; and resilient pressing means operatively connected with said one sprocket for biasing said sprocket in said direction to increase the contact pressure between said chain and said sprockets, said resilient pressing means providing a decreasing bias on said one sprocket as said regulating means moves said one sprocket to increase the contact pressure, so that said contact pressure has a minimum value when said driven sprocket offers no resistance.

5. A pressure generating apparatus, comprising a prime mover; a fluid pressure generating machine arranged to produce a stream of pressure fluid and to operate at varying loads whereby the pressure of fluid changes; a transmission for operating said machine, said transmission comprising a driven element operatively connected with said machine and arranged to offer varying resistance to transfer of motion thereto proportionally with changes in load upon said machine, and a driving element operatively connected with said prime mover and in motion transmitting engagement with said driven element, one of said elements being movable with respect to the other element in directions to change the contact pressure between said elements; regulating means operatively connected with said machine and with said one element for moving said one element in a direction to increase such contact pressure in response to increasing resistance which said driven element offers to transfer of motion by said driving element when the load upon said machine increases; and pressing means operatively connected to said one element for biasing said one element in said direction to increase the contact pressure between said elements, said pressing means providing a decreasing bias on said one element as said regulating means moves said one element to increase the contact pressure, so that said contact pressure has a minimum value when said driven element offers no resistance.

6. A pressure generating apparatus, comprising a fluid pressure generating machine having fluid-admitting intake means, outlet means through which compressed fluid is discharged therefrom, and fluid compressing means including a rotary shaft for drawing fluid through said intake means and for expelling pressure fluid through said outlet means in response to rotation of said shaft, said machine being arranged to operate at different loads and to expel fluid at pressures which change in response to changes in load upon said machine; a prime mover including a motor having a rotary output shaft; a transmission for transmitting rotation of said output shaft to said first mentioned shaft, said transmission comprising a driven element operatively connected with said first mentioned shaft whereby it offers varying resistance to transfer of motion thereto when the pressure of fluid which is being evacuated through said outlet means varies, and a driving element operatively connected with said output shaft and in motion transmitting engagement with said driven element; a support for said driving element and for said motor, said support being movable with respect to said driven element in directions to change the contact pressure between said elements; a fixed support; a regulating device operating between said supports and connected with said outlet means for moving said first mentioned support in a direction to increase the contact pressure between said elements in response to increasing pressure of fluid which is evacuated through said outlet means; and resilient pressing means operatively connected to said first mentioned support for biasing said first mentioned support in said direction to increase the contact pressure between said elements, said resilient pressing means providing a decreasing bias as said regulating device moves said first mentioned support to increase the contact pressure, so that said contact pressure has a minimum value when said load is at a minimum.

7. An apparatus as set forth in claim 6, wherein the resilient pressing means comprises a helical spring for biasing said first mentioned support in a direction to increase the contact pressure between said elements.

8. A pressure generating apparatus, comprising a fluid pressure generating machine having fluid-admitting intake means, outlet means through which compressed fluid is discharged therefrom, and fluid compressing means including a rotary shaft for drawing fluid through said intake means and for expelling pressure fluid through said outlet means in response to rotation of said shaft, said machine being arranged to operate at different loads and to expel fluid at pressures which change in response to changes in load upon said machine; a prime mover including a motor having a rotary output shaft; a transmission for transmitting rotation of said output shaft to said first mentioned shaft, said transmission comprising a driven element operatively connected with said first mentioned shaft whereby it offers varying resistance to transfer of motion thereto when the pressure of fluid which is being evacuated through said outlet means varies, and a driving element operatively connected with said output shaft and in motion transmitting engagement with said driven element; a support for said driving element and for said motor, said support being movable with respect to said driven element in directions to change the contact pressure between said elements; a fixed support; a regulating device operating between said supports and connected with said outlet means for moving said first mentioned support in a direction to increase the contact pressure between said elements in response to increasing pressure of fluid which is evacuated through said outlet means, said regulating means comprising a cylinder member defining a cylinder chamber, a piston member reciprocably extending into said chamber, one of said members engaging said fixed support and the other of said members engaging said first mentioned support, and conduit means connecting said chamber with said outlet means so that pressure fluid admitted into said cylinder member tends to expel the piston member from said chamber whereby the first mentioned support is moved in a direction to increase the contact pressure between said elements; and resilient pressing means operatively connected to said first mentioned support for biasing said first mentioned support in the direction to increase the contact pressure between said elements, said resilient pressing means providing a decreasing bias on said first mentioned support as said regulating device moves said first mentioned support to increase the contact pressure between said elements, so that when no pressure fluid is admitted to the cylinder said first mentioned support will be biased solely by said resilient pressing means to compensate for wear and maladjustment between the driving and the driven elemetns of said transmission, said contact pressure having a minimum value when said load is at a minimum.

9. An apparatus as set forth in claim 8, wherein said cylinder member is formed with throttling orifice means communicating with said chamber and with said conduit means so that the throttling orifice means reduces the sensitivity of said regulating means.

10. An apparatus as set forth in claim 8, wherein said first mentioned support is a rocker which is tiltable about a fixed axis in directions to move said driven element into stronger or weaker engagement with said driving element.

11. An apparatus as set forth in claim 8, wherein said first mentioned support is a carriage which is reciprocable in directions to move said driven element into stronger or weaker engagement with said driving element.

12. In a pressure generating apparatus, in combination, a fluid pressure generating machine arranged to operate at varying loads and having an outlet through which compressed fluid is being discharged at pressures proportional to variations in load upon the machine; a transmission comprising a driven element operatively connected with said machine for driving the same whereby any variations in load upon said machine cause said driven element to offer different resistance to transfer of motion thereto, and a driving element in motion transmitting engagement with said driven element, one of said elements being movable with respect to the other element in directions to change the contact pressure between said elements; a first support connected to and movable with said one element; a fixed second support; a regulating device comprising a cylinder member defining a chamber which is connected with said outlet, and a piston member reciprocably extending into said chamber, one of said members engaging said first support and the other member engaging said second support whereby any rise in pressure of fluid at said outlet causes said regulating device to move said first support in a direction to increase the contact pressure between said elements; and resilient pressing means operatively connected to said first support for biasing said first support in the direction to increase the contact pressure between said elements, said resilient pressing means arranged to bias with decreasing force as the regulating device moves said first support to increase the contact pressure between said elements so that even when no compressed fluid is being discharged said first support is biased by said resilient pressing means to compensate for wear and maladjustment between said driving and driven elements, said contact pressure having a minimum value when said load is at a minimum.

13. A combination as set forth in claim 12, wherein said transmission is a belt transmission having a pulley which constitutes said driving element and a belt which constitutes said driven element and is trained around said pulley.

14. A combination as set forth in claim 12, wherein said transmission is a friction gearing having a first friction wheel which constitutes said driving element and a second friction wheel which constitutes said driven element.

15. A combination as set forth in claim 12, wherein said transmission is a chain transmission having a sprocket which constitutes said driving element and an endless chain which constitutes said driven element and is trained around said sprocket.

16. A combination as set forth in claim 12, wherein the resilient pressing means operate between said cylinder member and said piston member.

17. A combination as set forth in claim 12, wherein one of said supports is provided with a socket and wherein the corresponding member comprises a ball which is received in said socket.

18. A combination as set forth in claim 12, further comprising means for detachably connecting one of said members to the respective support.

19. In a pressure generating apparatus, in combination, a fluid pressure generating machine arranged to operate at varying loads and having an outlet through which compressed fluid is being discharged at pressures proportional to variations in load upon the machine; a transmission comprising a driven element operatively connected with said machine for driving the same whereby any variations in load upon said machine cause said driven element to offer different resistance to transfer of motion thereto, and a driving element in motion transmitting engagement with said driven element, one of said elements being movable with respect to the other element in directions to change the contact pressure between said elements; a first support connected to and movable with said one element; a fixed second support; a regulating device comprising a cylinder defining a chamber connected with said outlet and having an annular external shoulder, and a piston having a cylindrical portion reciprocally extending into said chamber and a spherical portion located externally of said chamber, said spherical portion having a diameter larger than said cylindrical portion so that said portion defines a shoulder, one of said supports comprising a socket receiving said spherical portion, the other of said supports engaged by the cylinder so that any rise in the pressure of fluid at said outlet causes said regulating device to move said first support in a direction to increase the contact pressure between said elements; and a coil spring surrounding said cylinder and operating between said shoulders so that it biases said cylinder with respect to said piston in said direction with decreasing force whenever said fluid pressure increases, so that said contact pressure has a minimum value when said fluid pressure is at a minimum.

References Cited by the Examiner

UNITED STATES PATENTS

| | | | |
|---|---|---|---|
| 812,899 | 2/06 | Thacher | 74—242.9 |
| 1,433,016 | 10/22 | Larsh | 74—242.13 |
| 1,663,344 | 3/28 | Lennard | 74—242.9 |
| 1,730,319 | 10/29 | Dilks. | |
| 2,221,585 | 11/40 | Klein et al. | 74—242.11 |
| 2,575,313 | 11/51 | Covert et al. | 74—242.11 |
| 2,697,500 | 12/54 | Klopp | 74—209 X |
| 3,132,596 | 5/64 | Dinger | 74—242.11 X |

DON A. WAITE, *Primary Examiner.*

BROUGHTON G. DURHAM, *Examiner.*